S. C. ANKER-HOLTH.
CREAM SEPARATOR.
APPLICATION FILED FEB. 13, 1914.
1,212,168.
Patented Jan. 16, 1917.
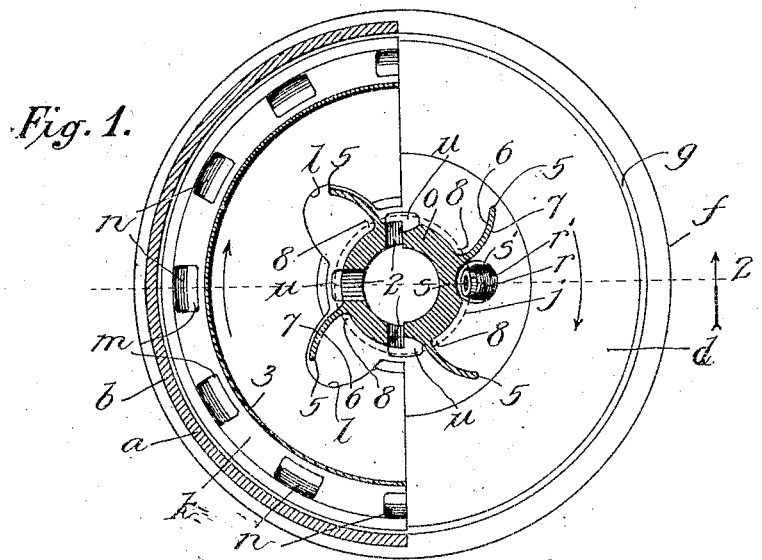
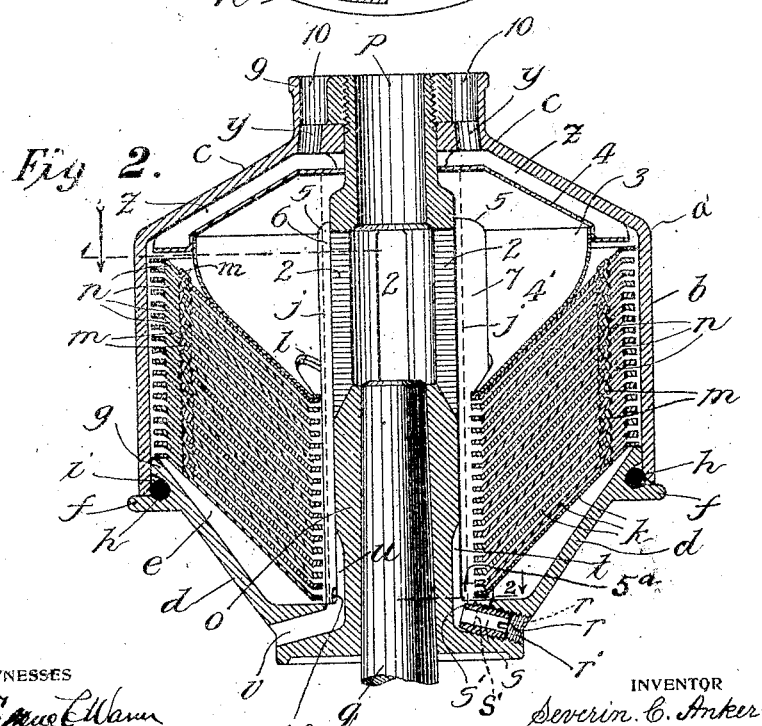
INVENTOR
Severin. C. Anker-Holth.
BY Poole & Cromer
ATTORNEYS

UNITED STATES PATENT OFFICE.

SEVERIN C. ANKER-HOLTH, OF PORT HURON, MICHIGAN.

CREAM-SEPARATOR.

1,212,168.

Specification of Letters Patent.  Patented Jan. 16, 1917.

Application filed February 13, 1914. Serial No. 818,596.

*To all whom it may concern:*

Be it known that I, SEVERIN C. ANKER-HOLTH, a citizen of the United States, and a resident of Port Huron, in the county of St. Clair and State of Michigan, have invented certain new and useful Improvements in Cream-Separators; and I do hereby declare that the following is a full, clear, and exact description thereof, reference being had to the accompanying drawings, and to the letters of reference marked thereon, which form a part of this specification.

This invention relates to that class of cream separators or centrifugal machines having a rotary bowl provided with disks or similar elements and adapted to be used for separating liquid of different specific gravity, such as cream or butter fat from milk, or the lighter from the relatively heavy portions of material to be operated upon or treated.

The principal object of the invention is to provide a simple, economical, efficient and sanitary cream separator.

A further object is to provide means whereby the incoming liquid or whole milk will be caused to pass the lighter liquid or cream contained in the bowl without materially disturbing the cream, and to enable the milk to be distributed in the separator in such a manner that it will be freed from dirt or other heavy particles or foreign substances and separated from the cream or butter fat in an efficient manner, so that a smooth uniform cream will be obtained and the skimmed milk which escapes from the bowl will be practically free from butter fat.

A further object is to provide means whereby the incoming milk will be caused to move at a speed which is at first much slower than the speed of rotation of the bowl and gradually increases with respect to the speed of the bowl, and whereby channels will be formed within or through the liquid contained in the bowl for the passage of the separated cream.

A further object is to provide means whereby clogging of the separator under ordinary conditions and temperatures will be prevented, even though the cream screw may have been turned in too far.

Other and further objects of the invention will appear from an examination of the following description and claims and from an inspection of the accompanying drawings, which are made a part hereof.

The invention consists in the features, combinations, and details of construction herein described and claimed.

In the accompanying drawings, Figure 1 is a view of a bowl shell constructed in accordance with my invention, showing one-half of the bowl shell including the hollow shaft and dirt chamber in horizontal section, at the left of the figure, as it would appear taken on line 1 of Fig. 2 looking downward, and showing the other half of the bowl as it would appear with the top or upper portion of the bowl shell removed, the portion of the hollow shaft at the right-hand side of the center of said figure being shown in horizontal section, taken on line 2 of Fig. 2 looking in the direction of the arrow, and showing the location and arrangement of the cream screw in the bowl bottom, as the bowl bottom and cream screw would appear with the disks and dirt chamber removed; and Fig. 2, a view in vertical section taken through the center of the bowl as it would appear taken on line 2 of Fig. 1 looking in the direction of the arrow.

In constructing a cream separator having a bowl made in accordance with my invention, I provide a bowl $a$ which, in the form shown in the drawings, comprises a main body portion $a'$ having peripheral walls $b$, an end wall $c$, and a bowl bottom or removable end member $d$ forming a separator chamber $e$. The end wall $c$ is integral with the peripheral walls of the casing or bowl shell, and the other end member of the casing is provided with a peripheral, laterally projecting flange $f$ adapted to engage the edge or rim of the main body or peripheral wall of the bowl shell. An inner flange or peripheral portion $g$ of the removable bowl member is adapted to engage the inner surface of the peripheral wall of the bowl shell, and a packing ring $h$ of compressible material is interposed between said inner rim $g$ and the part $b$ in a groove $i$, so as to form a liquid tight joint between the bowl member $d$ and the main body of the bowl shell. Separator disks or plates $k$, which are concave on one side and convex on the other and having central openings provided with laterally or radially disposed recesses or notches $l$ in the inner perimeters of the disks, are mounted in the bowl shell in superposed relation and, by preference, in laterally movable relation to each other, the disks being spaced apart by means of projections or bosses $m$ and provided with openings $n$ at or near their peripheries.

A central hollow shaft or tubular core member $o$ is mounted at the center of the bowl shell and is, by preference, made in one integral piece with one of the end wall portions or end members of the bowl shell. In the form shown in the drawings, this hollow shaft or central member is made integral with the bowl bottom member $d$ and is provided with a longitudinal central or axial opening $p$ therethrough or in at least the upper part thereof. The axial opening in the lower portion of the shaft is tapered or suitably formed and adapted to fit snugly upon and in fixed relation to an upright rotary spindle or shaft $q$ of a cream separator. The shaft $q$ is mounted in suitable flexible bearings (not shown) and is adapted to be operatively connected with suitable driving mechanism of a cream separator and forms a part of a cream separator which may be of any desired, ordinary or well known form.

A cream screw $r$ is rotatably mounted in threaded engagement with the bowl shell at or near one end thereof and provided with an opening $s$ through said screw adapted to form a cream-outlet opening, the open inner end $s'$ of said cream screw and the outlet opening formed thereby being adapted to communicate with the space located at or near the central portion of the bowl and in which the cream accumulates in the operation of separating cream from milk. A peripheral slot or opening $t$ is provided in the hollow shaft adjacent to the cream screw and is located in position to communicate with the opening formed by the cream screw. This slot or recess leads downward toward the cream screw or cream-outlet from a point encircled by or inside of the inner edges of adjacent separator disks, through the entire series of which the hollow shaft extends. Similar peripheral cream-outlet openings or grooves $u$ in the hollow shaft and leading downward on the inside of the inner edges of the disks, communicate with cream-outlet openings $v$ in the end member or wall $d$ of the bowl, so as to form overflow openings adapted to permit cream to pass out through the openings $v$, when the capacity or position of the cream screw or the condition of the cream is such that all of the cream required to pass out will not pass through the cream screw with sufficient facility to enable the best results to be accomplished. The opposite end portion or end wall of the bowl shell is provided with milk-outlet openings $y$, located at the inner extremity of radial milk-outlet passages $z$ which lead inward from the inner peripheral portion of the bowl shell adjacent to the outer peripheral edges of the disks to said milk-outlet openings $y$.

The hollow shaft or central tubular member $o$ of the bowl is provided with lateral openings 2 which lead from the inner axial opening $p$ and communicate with the interior of the separator chamber and with the interior of a dirt chamber and form lateral or radial inlet openings for the incoming milk to pass through. The dirt chamber is formed by a lower truncated cone shaped cup or inner casing portion 3 and a cover 4; said inner casing and covering being provided with central openings through which the hollow shaft extends. The inner casing members 3 and 4 are so arranged that the inner casing formed thereby engages the upper or adjacent separator disk and is located between said disk and the end wall or top portion $c$ of the bowl shell. Lateral accelerator wings or blades 5 project outward laterally and rearward from the periphery of the hollow shaft at an angle at suitable intervals, and are made, by preference, integral with the hollow shaft and bowl bottom member, said wings being arranged in position to extend laterally and rearward into the lateral grooves or openings $l$ in the separator disks and upward and downward along the periphery of the hollow shaft or tubular member $o$ and between the latter and the grooved inner edge portions of the disks through the entire series of disks or separator plates. Each of said wings or blades is curved or bent outward and rearward with respect to the direction of rotary movement of the bowl shell and hollow shaft, so that each wing or blade has a curved or concave rear surface portion or rearwardly facing side 6, and a convex surface or curved front side 7 which faces forward and outward in the direction of rotation of the bowl and hollow shaft, when the bowl is in operation. The outer portion of each wing or accelerator blade thus extends between the peripheral wall of the bowl shell and a peripheral surface portion of the hollow shaft located back of the base of the wing, or back of the radial line or plane in which the base of the wing is located and attached to or in engagement with the hollow shaft, thus forming a channel 8 directly back of each wing, which channel is within the hollow of the wing or in the form of a vertical longitudinal groove or channel having its forward side at the back of the wing which forms a forward and outer wall of the channel, the inner wall of the channel being formed by the hollow shaft. The channels or spaces 8 thus formed directly back of the concave or rearwardly facing curved sides of the blades and between said concave sides and the adjacent peripheral surface of the hollow shaft, are adapted to permit the cream to pass downward directly back of the concave rearwardly and inwardly facing rear surfaces or sides of the wings and between the outer rearwardly extending portions of the wings and the periphery of the hollow shaft, while the bowl is revolving at a high speed, in such a manner as to enable the incoming milk which at first presses against the front convex faces of the wings to be thoroughly distributed without unduly agitating or disturbing the lighter liquid or cream, particularly that portion of the cream which passes downward in the vertical channels or spaces 8.

The inner end of the cream screw is located just in advance and close to the inner edge or base and the forwardly facing convex side of an accelerator wing or blade and endwise beyond the ends of the blades and below and in position to communicate with the space between a plurality of the blades, and the cream-outlet or overflow passages $u$ are also between the blades or wings and, by preference, close to the forwardly facing or convex sides of the adjacent accelerator blades, as indicated in Fig. 1.

The upper and lower members of the bowl shell are removably secured together by means of the hollow shaft $o$ which is fixed to one of the bowl shell members and preferably made in one integral piece with the bowl bottom member $d$, as already suggested, and extends upward through the center of the bowl and through the central opening in the other or upper bowl shell member, the upper or outwardly projecting end of the hollow shaft being threaded and provided with a threaded nut 9 located on the outside of the bowl shell and in threaded engagement with said projecting end of the shaft. The nut 9 has openings 10 therethrough which communicate with the milk-outlet openings $y$ of the bowl shell, and are adapted to permit the passage of skimmed milk from the interior of the bowl shell.

Each accelerator blade 5 is provided with an opening or passage $5^a$ adapted to permit the passage of liquid from the front to the rear sides of the blades and to the cream outlets without going around the outer lateral edges or top edges of the blades. These passages $5^a$ may be between the bottom ends of the blades and the bowl bottom, as indicated in Fig. 2, or at any desired point in the blade intermediate the outer lateral edge of the blade and the axial center of the bowl, or nearer to the axial center of the bowl than are the outer edges of the blades.

In operation, the bowl is revolved at a high speed in the direction indicated by the arrows in Fig. 1. The milk enters the bowl through the central opening at the upper end of the hollow shaft, from whence it passes through the openings 2, and as the milk at the start has no circumferential speed while the hollow shaft with its accelerator wings and the rest of the bowl revolve at a high speed, it follows that the incoming milk will press against the front side of the wings 5, and, as some of the cream will follow the milk to the outer edge of the disks where the circumferential speed is very great—in practice ordinarily exceeding a mile a minute—it follows that this cream upon being caused to move inward or in working its way back toward the middle of the bowl where the circumferential speed is slower, will go faster than the wings and will gather behind or in the hollows or vertical channels 8 in or back of the curved accelerator wings 5 along which it passes downward and escapes out through the opening in the cream screw $r$ or through the overflow openings $v$ if the cream screw $r$ has been turned in too far. With the wings constructed as above described, the liquid immediately in front of each wing will be of such density that the cream or liquid of less specific gravity than the milk, particularly those portions or particles of the cream which move inward between the disks, will tend to find their way into the spaces or channels 8 back of the wings and pass along the back concave sides of the wings to the cream-outlet. If the milk contains any dirt or heavy particles, these will be taken up in the sediment chamber 4'. The rest of the milk which mainly consists of water, milk sugar, casein and other protein substances is by centrifugal force driven to the outside of the disks where the last possible traces of cream or butter fat will be separated from it and the skimmed milk will then pass upward through the holes $n$ near the outer edge of the disks and between the sediment chamber cover and the bowl-hood and out through the openings at the top of the bowl. The dotted lines $j$ in Figs. 1 and 2 indicate the surface of the cream when the bowl is in operation, with the cream screw in the position in which it is shown in full lines. The cream screw $r$ is shown in the drawings in full lines so far in that no cream can pass through it, thereby forcing all the cream to pass through the overflow or relief openings $v$. The cream screw $r$ is, however, ordinarily screwed so far out that all or substantially all of the cream passes through it when the separator is in operation. The cream screw is shown in the last mentioned position in broken lines in Fig. 2. The inner edge or mouth $s'$ of the hole $s$ in the cream screw, when in position to permit the proper passage of cream through the screw, is as far or farther away from the axis of the bowl than the outer edge of any of the overflow openings $v$, and the surface $j$ of the cream will then be as far away from the axis of the bowl as the inner edge $s'$ of the hole in the cream screw.

I claim:

1. In a cream separator, the combination of a rotary bowl shell, a central hollow shaft extending upward and downward on the inside of the bowl shell, and laterally projecting wings having their inner marginal portions secured to the hollow shaft, each of said wings extending from the periphery of said shaft outward laterally and having a rear surface facing inward toward the axial center and rearward with respect to the direction of rotation of the bowl shell.

2. In a cream separator, the combination of a rotary bowl shell, a central hollow shaft extending axially on the inside of the bowl shell and provided with a milk supply passage communicating with the interior of the bowl shell, and rearwardly curved blades having their inner edges secured to the hollow shaft, each of said blades extending from the periphery of said shaft outward laterally and having a concave rear surface facing inward toward the axial center and rearward with respect to the direction of rotation of the bowl shell.

3. In a cream separator, the combination of a rotary bowl shell provided with a cream outlet, a central hollow shaft fixed to and extending upward on the inside of the bowl shell and provided with a milk supply passage communicating with the interior of the bowl shell, and lateral accelerator wings rigidly attached to the hollow shaft and extending from the periphery of the shaft outward, and having rear curved surfaces facing inward toward the axial center and rearward with respect to the direction of rotation of the shaft, each of said wings being provided with an opening adapted to permit the passage of liquid from the front to the rear side of the wing.

4. In a cream separator, the combination of a rotary bowl shell having top and side walls and a bowl bottom and provided with a cream outlet opening, a central hollow shaft fixed to the bowl bottom and extending upward therefrom on the inside of the bowl shell, said hollow shaft being provided with a milk supply passage communicating with the interior of the bowl shell above the level of the cream outlet opening, and accelerator blades fixed to the hollow shaft and each having a rear face extending from the periphery of the shaft outward laterally and facing inward toward the axial center and rearward with respect to the point of connection with the shaft and with respect to the direction of rotation of the bowl shell.

5. In a cream separator, the combination of a rotary separator bowl comprising in its construction a bowl shell having a cream outlet opening, a central hollow shaft on the inside of the bowl shell and provided with a milk supply passage having an opening communicating with the interior of the bowl shell, and lateral accelerator blades mounted on opposite sides of a milk supply opening in the shaft and in fixed relation to said shaft, each of said blades having a curved rear face extending from the periphery of the shaft outward laterally and facing inward toward the axial center and rearward with respect to the direction of rotation of the bowl.

6. In a cream separator, the combination of a rotary separator bowl comprising in its construction a bowl shell having a cream outlet opening, a central hollow shaft fixed to the bowl bottom and extending upward on the inside of the bowl shell, and rearwardly curved accelerator blades fixed to the hollow shaft and each extending from the periphery of the shaft outward laterally and rearward having a concave rear surface facing inward toward the axial center and rearward with respect to the direction of rotation of the bowl, each of said accelerator blades being provided with an opening located intermediate the outer lateral extremity of the blade and the axial center of the bowl shell, adapted to permit the passage of liquid from the front to the rearward side of the blade.

In testimony that I claim the foregoing as my invention I affix my signature in the presence of two witnesses, this 27th day of January A. D. 1914.

SEVERIN C. ANKER-HOLTH.

Witnesses:
EUGENE C. WANN,
HARRY IRWIN CROMER.